June 13, 1950 P. BREKKE 2,511,396
QUICK ACTION COUPLING
Filed April 30, 1945
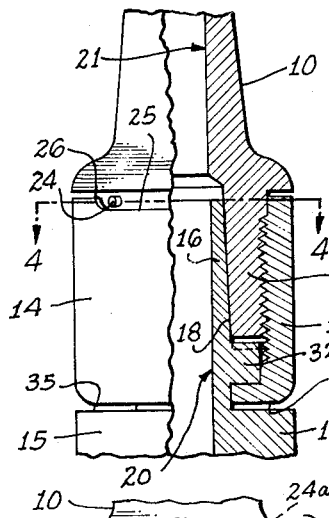
Fig. 1
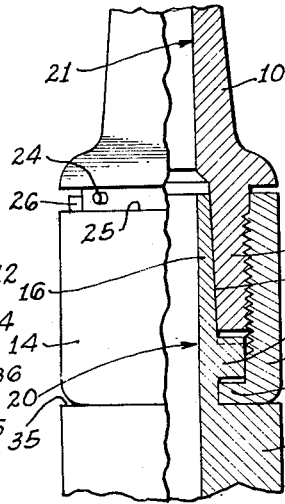
Fig. 2
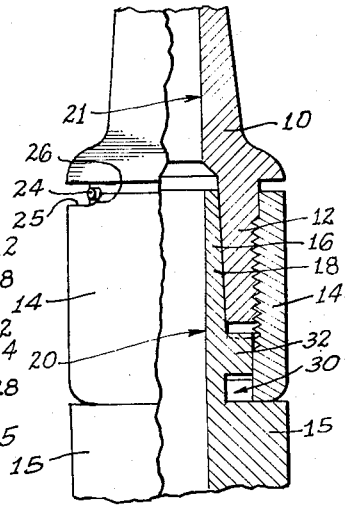
Fig. 3
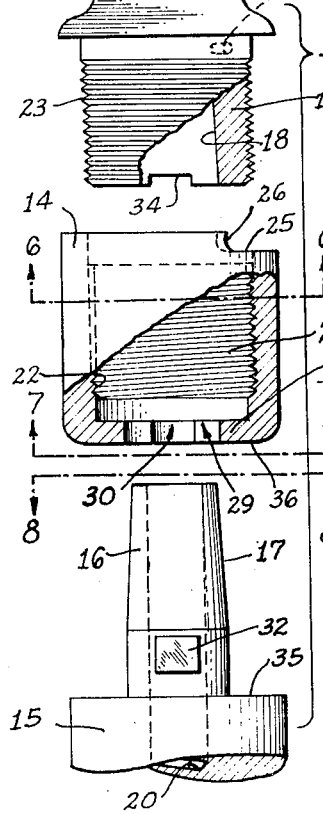
Fig. 5  Fig. 4
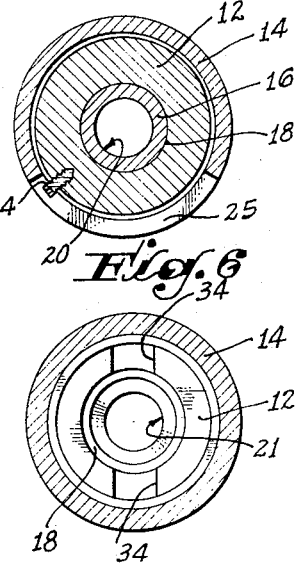
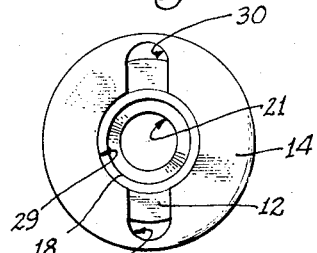
Fig. 7
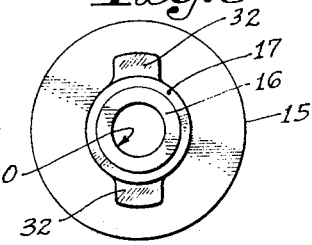
Fig. 6  Fig. 8
INVENTOR
PETER BREKKE
BY
HARRIS, KIECH, FOSTER & HARRIS
Clarence F. Kiech
FOR THE FIRM
ATTORNEYS Patented June 13, 1950

2,511,396

UNITED STATES PATENT OFFICE 2,511,396

QUICK ACTION COUPLING

Peter Brekke, Los Angeles, Calif., assignor to George G. Bakewell, doing business as Bakewell Aircraft Products Company, Los Angeles, Calif.

Application April 30, 1945, Serial No. 591,085

10 Claims. (Cl. 285—177)

This invention relates to coupling devices and more particularly to that type which makes rigid joints.

A principal object of the invention is to provide a rigid coupling which will permit quick engagement and disengagement, and, when the parts are engaged, will at the same time insure perfect alignment and take care of all torque influences. A further object is to provide a coupling such that forces encountered in use will not tend toward disengagement of the parts, disengaging movements occurring instead, only under positive manipulation.

Another object is to provide a type of coupling which will be satisfactory for use as a tool joint and will also be capable of providing tight seals when used as hose and pipe connections for fluid lines, such as air hoses, fire hoses, pipe lines for oil and water, and other uses where leakage under high pressures is to be avoided.

The provision of high pressure contacts in couplers, such as electrical couplers, and for other uses, is also an object of this invention.

Various features of the invention are found in a preferred embodiment in which the coupler comprises a tapered stem member adapted to be fitted tightly in aligned relation in a correspondingly tapered bore of a socket member, a connecting collar being threaded on one member and detachably and rotatably held on the other member for limited rotative movement on both members. The mounting of the collar provides for quick disengagement of the two members by positively breaking the joint between the tapered portions, and for quick making of the joint when the parts are brought together, these making and breaking operations being accomplished by only partial revolutions of the collar in opposite directions.

Thus, it is a further object of the invention to provide a coupler having means for positively breaking the joint and insuring quick disengagement.

Other objects and features of the invention will become apparent to those skilled in the art upon reference to the following specification and accompanying drawing wherein one form is disclosed for the purpose of illustration. In the drawing, Fig. 1 is a view partly in longitudinal section and partly in side elevation showing the coupling parts in fully engaged position, a right hand thread being employed, and the connecting collar being substantially at the limit of its engagement;

Fig. 2 is a view similar to that of Fig. 1 but showing the connecting collar partially turned in a reverse direction, that is to the left, to initiate the joint-breaking step;

Fig. 3 is a view similar to those of Figs. 1 and 2 but showing the connecting collar at the limit of its disengaging or joint-breaking movement;

Fig. 4 is a cross section taken on the line 4—4 of Fig. 1;

Fig. 5 is an exploded view partly in elevation and partly in section, showing all the parts in aligned but fully disengaged relationship;

Fig. 6 is a cross section taken on the line 6—6 of Fig. 5; and

Figs. 7 and 8 are end elevations taken respectively on the lines 7—7 and 8—8 of Fig. 5.

According to the form of the invention illustrated, the principal parts are: a socket member 10 having a socket 12; sleeve-like securing means in the form of a flanged connecting collar 14; and a stem member 15 having a tapered terminal stem 16 provided with an externally tapered frusto-conical surface 17 adapted to engage a correspondingly tapered bore 18 of the socket 12. When the parts are placed in fully engaged position as illustrated in Fig. 1, a fluid tight seal is formed by the tapered joint between the walls of the tapered stem 16 and the bore 18. This joint serves to align the parts along their common axis which is defined in this form by the axis of a central fluid passage 20 through the stem member 15 and the axis of a central fluid passage 21 through the socket member 10.

The collar 14 is normally connected with the socket member 10 by internal threads 22 on the collar 14 and external threads 23 on the socket 12. The number of thread turns is adequate to resist all longitudinal strains required to be withstood by the coupling, but the rotation of the collar 14 with respect to the socket 12 is preferably limited to some arc less than 360°, e. g. 120°, the pitch of the threads being such as to provide within this arc the amount of relative longitudinal movement required. This limitation of movement is obtained by a stop such as a pin 24 which may be threadedly mounted in the socket 12 adjacent its juncture with the socket member 10, the pin 24 being received in a peripheral slot 25 in the adjacent edge of the collar 14. Shoulder-forming ends 26 of the slot 25 constitute abutments, one of which is adapted to strike the pin 24 when the collar 14 is turned to open position, whereby to limit travel in the respective direction.

The limiting factor of the arc of rotation of the collar 14 is the specific means employed for retaining the stem 16 within the collar 14 and the socket 18. In the construction shown, the collar 14 is provided with an inwardly turned flange 28 which is provided with a centrally disposed aperture 29 through which the stem 16 passes into its seating position in the tapered bore 18. At opposite sides of the aperture 29, passages are provided in the form of notches 30 which are adapted to pass diametrically opposed lugs 32 on opposite sides of the tapered stem 16. The outer edges of the lugs 32 are adapted to seat upon the inner face of the annular flange 28 upon relative rotation of these parts, the flange 28 thereby serving to retain the stem member 15 with its tapered stem 16 in the tapered bore 18. Rotation of the collar 14 and its flange 28 thus forces the stem 16 into seating engagement with the bore 18, the lugs 32 serving as thrust pins, and the flange 28 serving as a thrust bearing by which the stem 16 is forced into its seating engagement with the bore 18.

In order that the stem 16 may be interlocked with the socket 12 to prevent relative rotation of the stem 16 in the bore 18, the edge of the socket 12 is provided with diametrically opposed recesses 34 which receive the inner edges of the lugs 32 when the parts are in seated relation. When two lugs 32 are employed, as illustrated, the limit of rotation of the collar 14 upon the socket 12 must be less than 180° in order to align the notches 30 with the recesses 34 for assembly, and to avoid rotation of the notches 30 far enough to disengage the lugs 32 and permit the stem 16 to drop from the engaging position. Similarly, if three lugs 32 were employed, the rotation of the collar 14 upon the socket 12 would need to be less than 120°. On the other hand, if suitable seating were accomplished for a given purpose by the employment of a single lug 32, the limit of rotation would need only to be less than 360°, but could be more than 180°. The stop pin 24 in the socket 12 performs this function in cooperation with the slot 25, whose abutment shoulders 26 provide the required arc of rotation for the collar 14. In the form illustrated, this is approximately 120°, and accommodates the situation where two lugs 32 are employed in cooperation with two retaining recesses 34.

In order to provide for positive dislodgement of the tapered stem 16 from the tapered bore 18, the stem member 15 is provided with an annular abutment shoulder 35 which is adapted to be engaged by an annular shoulder 36 of the collar 14 when the collar 14 is rotated reversely for disconnection of the parts. This abutment of the actuating shoulder 36 against the abutment shoulder 35 forces the stem 16 out of its seat. Continuation of the reverse rotation of the collar 14 eventually brings the notches 30 into alignment with the lugs 32 so that the latter may be withdrawn through the notches 30 and the tapered stem 16 entirely removed from the socket 12 and the collar 14. One of the principal functions of the stop pin 24 is to limit this reverse rotation and thereby insure approximate alignment of the notches 30 with the recesses 34, so that the stem 16 may be readily inserted or removed. The actual limit of forward rotation of the collar 14 is reached when the stem 16 has been forced into its seat, this occurring before the notches 30 are again brought by forward rotation into alignment with the lugs 32. Another important function of the stop pin 24 is to prevent removal of the collar 14 from the socket member 10.

In operation of the construction of this invention the collar 14 is threaded upon the socket 12 of the socket member 10 into a position such as illustrated in Figs. 2 and 3, and the stop pin 24 is inserted into an aperture 24a (Fig. 5) so that the pin 24 lies in the slot 25 in the edge of collar 14. In this manner, rotation of the collar 14 in either direction upon the threads is limited to the length of the slot 25.

Rotation is thus less than 360° and may be less than 120°, that shown in the drawings being somewhat less than 180°, as best indicated in Fig. 4.

Having assembled the collar 14 on the socket member 10 in proper operative relation, connection of the stem member 15 is accomplished by rotating the collar 14 to align the notches 30 with the recesses 34 in the socket 12, and then introducing the tapered stem 16 through the aperture 29 of the collar 14, the lugs 32 being aligned to pass through the notches 30 so that their inner edges enter the recesses 34. In this position, the outer edges of the lugs 32 slightly clear the inner wall of the flange 28, thereby permitting rotation of the collar 14. This initial position is illustrated in Fig. 3. By rotating the collar 14 to the right (using right hand threads, as shown in the drawing), the flange 28 is moved under the outer edges of the lug 32 into a position such as illustrated in Fig. 2. The rotation of the collar 14 is continued to a position such as illustrated in Fig. 1 where the tapered stem 16 is forced tightly into engagement with the tapered bore 18 of the socket 12, the lugs 32 serving as a thrust bearing whereby the stem 16 is driven into its seat.

With the parts in their assembled position, as shown in Fig. 1, the engagement of the inner edges of the lugs 32 in the recesses 34 prevents rotation of the stem 16 in the socket 12, and the flange 28 of the collar 14 bearing against the lugs 32 maintains firm engagement. The taper of the stem 16 and the bore 18 is adequate to maintain positive alignment of the socket member 10 and the stem member 15 with each other, and to resist lateral stresses. At the same time, the engagement of the lugs 32 in the recesses 34 resists torque about the axis of the coupler. Inasmuch as the anchoring of the parts in their operative relationships is accomplished solely by means of the collar 14 which is threaded into binding position upon the socket 12, there is no means by which accidental displacement can result.

Thus, this construction provides a positive lock. The smooth tapered bore 18 and the corresponding smooth tapered surface of the stem 16 provide a tight seal when the coupler is being used for high pressure fluids. Similarly, a rigid joint is provided when the coupler is to be used as a tool joint. When it is desired to break the joint, the collar 14 is rotated to the left from the position shown in Fig. 1 to the position shown in Fig. 3, where the notches 30 in the flange 28 of the collar 14 are brought into alignment with the lugs 32. During rotation of the collar 14 to this position, the actuating shoulder 36 of the collar 14 drives against the annular abutment shoulder 35 of the stem member 15 and thereby positively forces the stem member 15 outward, thus breaking the joint between the tapered stem 16 and the tapered bore 18. The collar 14 having reached the position of Fig. 3, the lugs 32 may be drawn through the notches 30, and the stem member 15 thereby disconnected from the socket member 10 and the collar 14.

From the foregoing description of construction and operation, it is apparent that the parts of the coupler may be quickly assembled and quickly disassembled. The device is useful not only as a tool joint and as a coupler for high pressure fluid lines, but is useful as any other form of coupling where high pressure or positive contact is required. Thus, the present apparatus may be employed as an electrical coupler to produce high pressure contact, as in connection with welding machines, arc lights, battery chargers, cathode connections and the like. It is useful for other mechanical couplings such as drill pipes, flag poles and other types of standards, removable joints for scaffolding, machine tool holders, and all kindred types of equipment. In the case of the use of the coupler for high pressure, this applies to all appropriate uses such as gas lines, oil lines, fire hose, air hose, and in other gas and hydraulic connections.

From the foregoing description, it will be apparent to those skilled in the art that various modifications of the generic invention here disclosed, may be made. It is intended, therefore, to cover all such variations as fall within the scope of the appended claims.

I claim as my invention:

1. A coupling device comprising in combination: a socket member having an internally tapered bore; a stem member having an externally tapered portion corresponding with said tapered bore, and adapted to be tightly engaged therewith; threads provided externally on one of said members; an internally threaded collar adapted to engage said threads, said collar having an inwardly projecting flange portion provided with slots extending therethrough; and outwardly projecting shallow means carried by the other of said members at the base of said tapered stem portion and adapted to be passed through said slots and to engage within said flange and so that rotation of said collar in one direction will force said tapered portion into said tapered bore, said collar and said other member being respectively provided with opposed engaging means so that reverse rotation of said collar on said threads will cause said collar to disengage said other member from said socket member.

2. A coupler comprising in combination: a socket member having a bore; a stem member having a portion adapted to be seated within said bore to align said members on a common axis; a rotatable collar having a thread-type connection with one of said members and provided with an inwardly turned flange having an inner wall transverse to said axis and having passages therethrough; and retaining means carried by the other of said members and adapted to be passed through said passages and also adapted to engage said inner wall for retention of said other member in said collar, and whereby rotation of said collar in one direction drives said retaining means and forces said portion into firm engagement with said bore, said stem member being movable through said collar to and from seating position, said one of said members being provided with shallow notches on its extremity which is within said collar, said notches being adapted to receive corresponding portions of said retaining means, said stem member being rotatable in said bore when said retaining means is disengaged from said shallow notches, and being non-rotatable in said bore when said retaining means is retained in said notches by said collar.

3. A combination as in claim 2, including: a pin on said one member for limiting rotation of said collar on said one member to prevent detachment from said thread type connection, said pin working in a slot in said collar.

4. A combination as in claim 2, including: actuating means on said collar; and cooperating means on said other member adapted to be engaged by said actuating means to disengage said stem member from its seat in said socket member on reverse rotation.

5. A coupler comprising in combination: a first member; a second member adapted to seat firmly on said first member; a rotatable collar for threaded mounting upon one of said members and adapted for rotatable connection with the other of said members to draw said members into seating position, said collar having a central aperture for passage of said other member therethrough and having a passage at a side of said aperture; a lug on said other member and adapted to pass through said passage and to engage within said collar for retention of said other member in said collar, whereby forward rotation of said collar on said one member draws said members together; and a pin upon said one member for limiting rotation of said collar on said one member to prevent detachment from said thread type connection, said pin working in a slot in said collar, the length of said slot determining the amount of rotation of the collar.

6. A combination as in claim 5, including: stop means to limit rotation of said collar to an arc of less than 360°, said stop means providing for reverse rotation of said collar to a position to release said lug through said passage and providing for said forward rotation of said collar.

7. A coupler comprising in combination: a socket member having a bore and having a shallow recess in a free extremity thereof adjacent said bore; a stem member having a portion adapted to seat in said bore; a lug on one side of said stem member beyond said portion, one edge of said lug being adapted to seat in said recess when said portion is seated in said bore, whereby to prevent relative rotation of said members; and a collar threadedly mounted on said socket member, said collar having an inwardly directed annular flange provided with an aperture to pass said portion and a passage to pass said lug into its seat in said recess, said collar being rotatable on its threaded mounting to engage under said lug and force said portion into its seat in said bore, said stem member being rotatable in said bore when said lug is disengaged from said shallow recess, said stem member being non-rotatable in said bore by reason of engagement of said lug in said recess when said collar engages said lug and seats said portion in said bore.

8. A combination as in claim 7, including: stop means to limit rotation of said collar to an arc of less than 360°, said stop means providing for reverse rotation of said collar to a position to align said passage with said recess and providing for forward rotation of said collar to bind said portion tightly in said bore.

9. A coupling device comprising in combination: a socket member having an internal bore; a stem member having an external portion corresponding with said bore and adapted to engage with the latter in sealing relation, said members having passages therethrough adapted to be aligned upon engagement of said external portion with said bore, one of said members being provided with external threads; and an internally threaded collar adapted to be rotatably carried by the other of said members and adapted to engage said threads to move said external portion of said stem into engagement with said bore, said threaded collar being provided with an inwardly directed flange provided with passages extending axially, and said other member being provided with outwardly projecting lugs adapted to be passed through said passages and to engage within said flange, said externally threaded member being provided on its extremity within said collar with shallow notches to receive correspondingly shallow portions of said lugs, said stem being rotatable in said bore when said lugs are disengaged from said shallow notches, and being non-rotatable in said bore when said lugs are held in said notches by said collar.

10. A combination as in claim 9 wherein said bore is tapered and said external portion of said stem is tapered to fit said bore when in sealing position.

PETER BREKKE.

REFERENCES CITED

The following references are of record in the file of this patent:

UNITED STATES PATENTS

| Number | Name | Date |
|---|---|---|
| 941,934 | Marsh | Nov. 30, 1909 |
| 1,596,645 | Whatley | Aug. 17, 1926 |
| 1,948,762 | Kirkpatrick | Feb. 27, 1934 |
| 2,083,228 | Geyer | June 8, 1937 |